United States Patent [19]

Hightower et al.

[11] 4,010,619
[45] Mar. 8, 1977

[54] REMOTE UNMANNED WORK SYSTEM (RUWS) ELECTROMECHANICAL CABLE SYSTEM

[75] Inventors: John D. Hightower, Kailua, Hawaii; George R. Beaman, Leucadia, Calif.; George A. Wilkins, Kailua; Douglas W. Murphy, Kaneohe, both of Hawaii

[73] Assignee: The United States of America as represented by the Secretary of the Navy, Washington, D.C.

[22] Filed: May 24, 1976

[21] Appl. No.: 689,306

[52] U.S. Cl. .............................. 61/69 R; 114/16 R; 174/28; 174/115; 340/6 R
[51] Int. Cl.² ........................................ B63C 11/34
[58] Field of Search .................. 61/69 R, 69 A, 63; 114/16 R

[56] References Cited

UNITED STATES PATENTS

| 3,354,658 | 11/1967 | Leonardi | 61/69 R |
| 3,626,903 | 12/1971 | Richburg | 61/69 R |
| 3,675,607 | 7/1972 | Dorschel | 61/69 R |
| 3,880,103 | 4/1975 | Talkington | 114/16 R |

*Primary Examiner*—Jacob Shapiro
*Attorney, Agent, or Firm*—Richard S. Sciascia; Ervin F. Johnston; William T. Skeer

[57] ABSTRACT

A tethered underwater work system comprises a primary lift module attached to a support vehicle by means of a primary tether. A submarine work vehicle is removably attached to said primary lift module and connected thereto by means of a secondary tether. Additionally, the lift module contains electrical distribution systems to permit an extensive control and instrumentation linkage with the submarine work vehicle and remotely controlled manipulators mounted thereon.

27 Claims, 9 Drawing Figures

REMOTE UNMANNED WORK SYSTEM (RUWS) ELECTROMECHANICAL CABLE SYSTEM

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention relates to the field of naval architecture and marine engineering. More particularly, the invention pertains to the field of remote control submarine vehicles. In greater particularity, the invention pertains to remotely controlled submarine vehicles operating from a tethered control arrangement. In still greater particularity, the invention permits a tethered submarine work vehicle to be selectively connected to, and disconnected from, a left module by means of a secondary tether. By way of further characterization, the invention pertains to a submarine work system in which a tethered submarine work vehicle is connected to a tethered lift module by means of an instrumentation linkage such that independent movement about the lift module is made possible.

DESCRIPTION OF THE PRIOR ART

In many marine activities, it is necessary to identify and recover objects or to work on objects which are located beneath the surface of the sea. For example, in the fields of archeology, petroleum production, marine salvage, and transcontinental communication, a need exists to be able to perform work at the bottom of the sea. In the past, performance of underwater work has depended primarily on placing a diver in the work location and providing life support at the ocean depths. Quite obviously, such marine operations are greatly influenced by weather conditions and water conditions which will permit the employment of these divers. In modern times, oceanographic work, such as discussed above, is being performed in increasingly hostile waters such as experienced in the vicinities of the poles or at extreme depths. Despite great strides in diving equipment, the conditions in these hostile environments permit employment of divers only for limited periods.

The use of small submersible vehicles has been proposed in the prior art to replace the diver in such work environments. However, such submarine vehicles are expensive to operate and require considerable surface support operations. Additionally, the size of a submarine vehicle necessary to perform the desired work is cumbersome and difficult to maneuver into close operating position with respect to objects on the ocean floor.

SUMMARY OF THE INVENTION

The system of the invention uses a lift module containing basic power and communication distribution systems and possessing structural strength necessary to be lowered to great ocean depths and to stay on station for extended periods of time. A smaller work vehicle is removably attached to the lift module and within the limits of a secondary tether is free to move independently in a predetermined area about the lift module. Thus, the submarine work vehicle may be a smaller, more easily maneuvered vehicle, such that it may assume a work position in close work relationship to the underwater object and remote from the deployment station of the lift module.

STATEMENT OF THE OBJECTS OF THE INVENTION

It is accordingly an object of this invention to provide an improved tethered submarine vehicle.

Another object of this invention is to provide an improved tethered submarine vehicle.

Still another object of this invention is to provide a tethered submarine work vehicle which is adapted to perform work as great depths and to remain on station for a considerable length of time.

Another object of this invention is to provide an improved means for handling tethered submarine vehicles using a constant tension marine crane effectively connected to pay out and retrieve the vehicle cable.

Still a further object of this invention is to provide a tethered submarine work system comprising a pair of separable submarine vehicles.

These and other objects of the invention will become more readily apparent in the ensuing specification when taken together with the drawings.

DESCRIPTION OF THE PREFERRED EMBODIMENT

Figure 1:
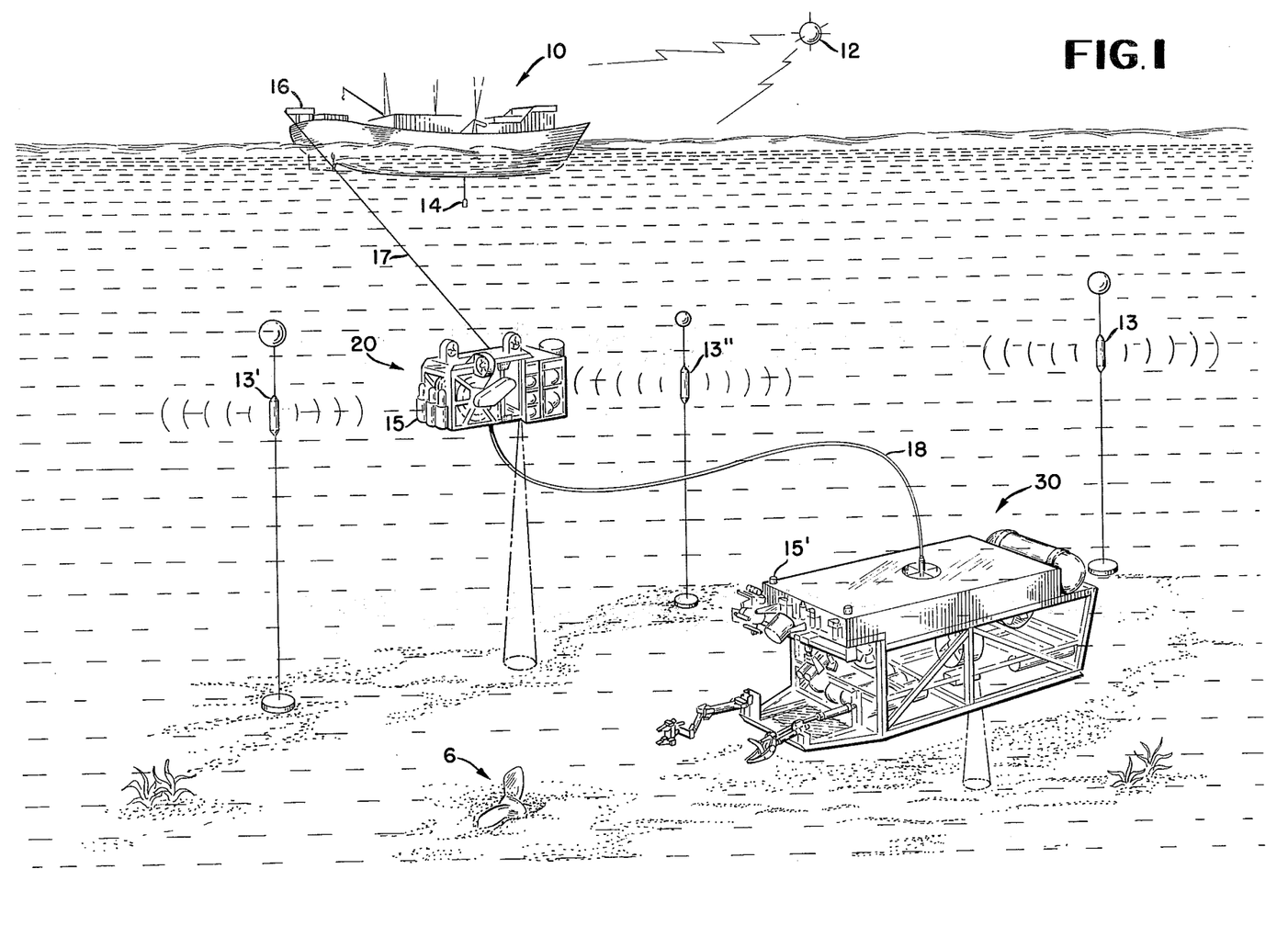
FIG. 1 is an elevation view, partly in section, illustrating the system of the invention in an operational environment.

Referring to FIG. 1, a surface ship 10 is shown as a control station for the system of the invention. Ship 10 obtains the navigational fix in the vicinity of an object 6 by means of electronic navigation from a navigational satellite 12. Similarly, a trio of acoustic beacons indicated at 13, 13', and 13'', are deployed for underwater navigation in the vicinity of the work station. Such acoustic beacons may be acoustic transponder units of conventional design. The trio of acoustic beacons co-operate with a hydrophone 14 on the underside of surface vessel 10 and, additionally, may cooperate with transducers 15 and 15' located on the lift module 20 and the submarine work vehicle 30, respectively.

A primary tether 17 provides both power and communication facility to the lift module 20, which may be considered a primary cable termination, or, more briefly, PCT. Additionally, primary tether 17 can be used to lower or lift payload items other than the primary lift module and work vehicle. As will be presently described, a secondary cable tether 18 is connected to lift vehicle 20 and wound onto an oceanographic winch by suitable means contained thereon. Tether 18 is terminated at its distal end by the submarine work vehicle 30.

Figure 2:
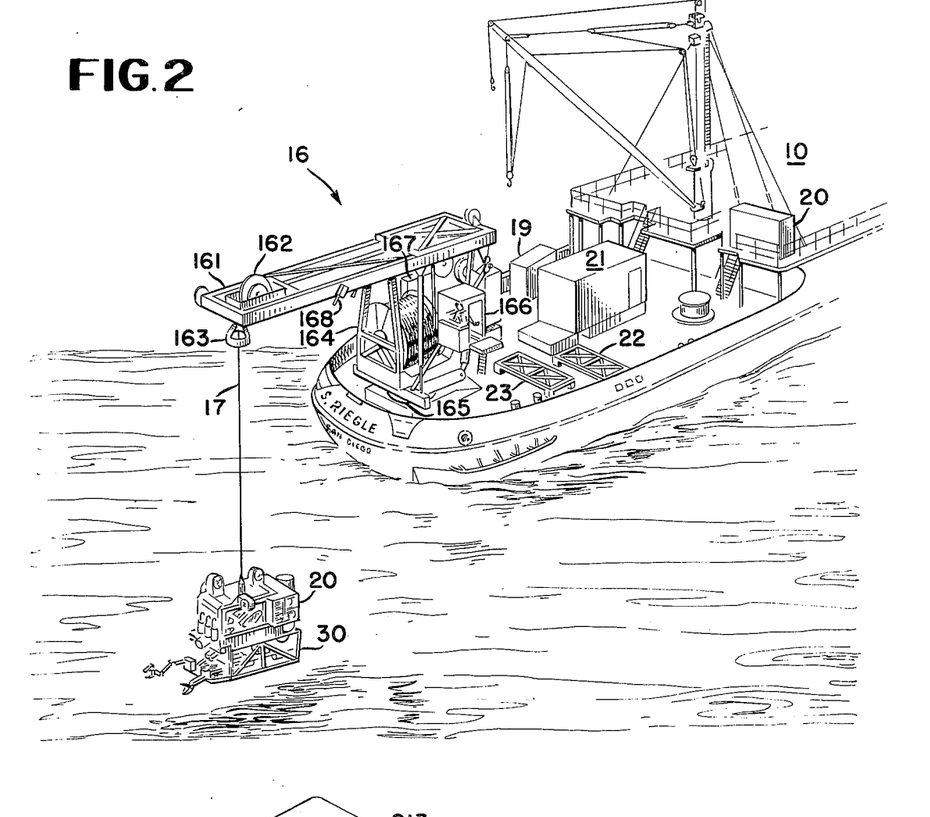
FIG. 2 is a perspective view of the surface support ship utilized in the system of the invention.

Referring to FIG. 2, the surface support details of the system may be more readily perceived. As shown, PCT 20 and submarine work vehicle 30 are united during ascent and descent to facilitate handling, launch, and recovery.

Primary tether cable 17 is payed out and recovered by means of oceanographic crane 16 specially adapted to operate with the unitary assembly of PCT 20 and submarine work vehicle 30. Oceanographic crane 16 is preferably of the constant-tension type to prevent the tension transmitting layers from overstressing or "birdcaging" should the tensional loading suddenly change.

As shown, crane 16 has an essentially horizontal boom 161 having a sheave 162 mounted at the outboard end thereof. Sheave 162 includes roller bearing supports, a latched closure to prevent the primary tether cable 17 from climbing out of engagement therewith, and a dynamometer for direct readout of cable tension. Such cable sheaves are state-of-the-art marine engineering hardware.

A catch and bumper 163 secure the united lift vehicle and submarine work vehicle in the uppermost position on boom 161.

Boom 161 is supported by a base 164 which swivels about a deck-mounted swivel base 165. Crane 16 is controlled from a cab 166 by an operator and by means of a ship's movement compensating control system, indicated generally at 167, which serves as an automatic stabilizing system. Such stabilizing systems are well known in the marine crane arts and, accordingly, need not be described in greater detail herein.

If desired, a television camera 168 may be mounted on boom 161 and directed to photograph the surface where primary tether cable 17 enters the water. By coupling the electrical signal output of camera 168 to control cab 166 and control van 21, the operators of the crane 16, and operation personnel in control van 21 may be afforded a view of launch and recovery of the combined work system. Generators 19 and 19' provide electrical power for the operation of crane 16 and control van 21 respectively.

Shipboard dollies 22 and 23 are positioned alongside crane 16 where they may receive submarine work vehicle 30 and PCT (or lift module) 20 for deck storage thereon. This use of two dollies permits the submarine work vehicle 30 and the PCT module 20 to be separated during shipboard storage thus facilitating overhaul, repair, routine maintenance, and portable, tween-deck storage.

The entire system illustrated in FIG. 2 may be considered highly portable inasmuch as it may be fitted to any surface vessel in a very short time thereby permitting rapid deployment to serious maritime disaster scenes to speed recovery and rescue missions.

Figure 3:
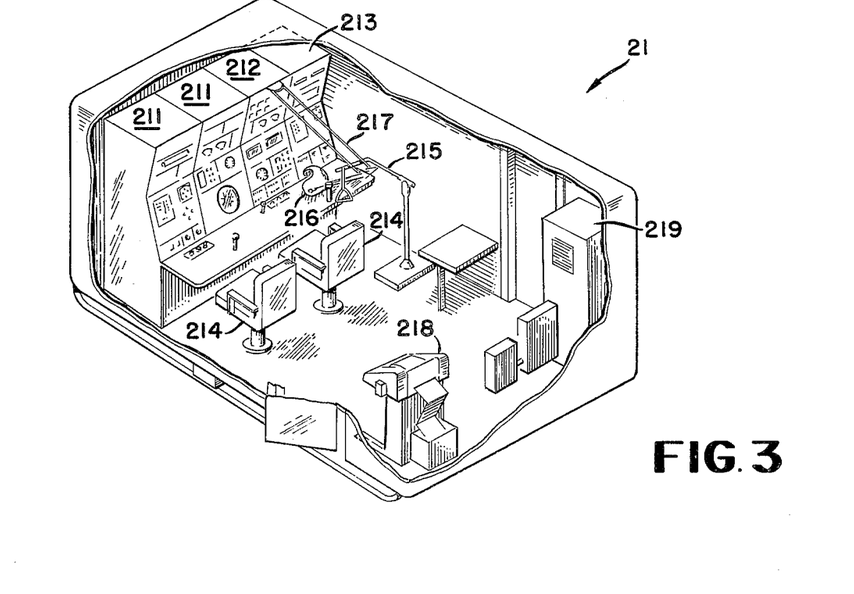
FIG. 3 is a cut-away perspective view of the control van illustrated in FIG. 2.

Referring to FIG. 3, the interior of control van 21 is illustrated. Control van 21 provides for two operators and occasional observer and maintenance personnel to control both the PCT module 20 and submarine work vehicle 30. A plurality of electronic consoles may be arranged in the interior of van 21 along one end thereof and may comprise, for example, two control racks 211 for the control of PCT module 20. Console instrument rack 212 and 213 are used to control submarine work vehicle 30.

The control of submarine work vehicle 30, and particularly the manipulator and television systems thereon, is accomplished by coupling the head and arm movements of an operator to control linkages to translate movements thereof into electrical control signals. Thus, a helmet 216 is supported by control linkage 217 to cause the underwater vehicle's television camera to follow and track the head movements of an operator seated in front of console 212. Helmet 216 includes a T.V. display such that the wearer thereof obtains a visual simulation of an operator on the submarine work vehicle 30.

Similarly, a control linkage 215 is gripped by the hand of the operator and manipulated such that the control of the remote manipulator follows the hand and wrist movement of the operator.

Figure 4:
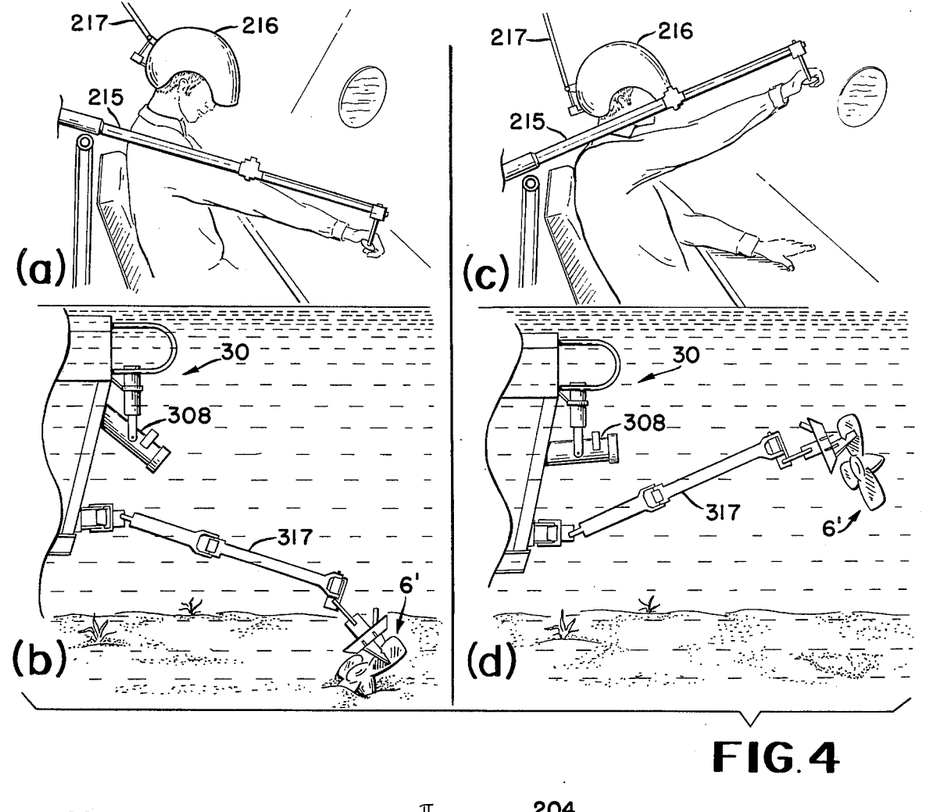
FIG. 4 is a four-view perspective illustration of the control features according to the invention.

Referring to FIG. 4, the wrist control arrangement may be more readily visualized. Thus, in FIG. 4a the operator, who wishes to inspect something at the lower side of his helmet display moves his head downward. Helmet 216 is carried by the operator's head movements and its position is sensed by control linkage 217. As shown in FIG. 4b, this motion is coupled to television camera 308 to focus the camera in a downward direction such that object 6' may be viewed thereby. Similarly, the operator extends his arm outwardly and operates a grip at the terminal end of linkage 215 such that manipulator 317 makes a corresponding movement to grip object 6'.

As shown in FIG. 4b the operator may raise his head and arm and wrist movements such that the control linkages 217 and 215 duplicate this movement in camera 308 and manipulator 317 as shown in FIG. 4d.

Thus, the operator by making suitable physical movements of his head and arm may control both the view presented him and operate the manipulator. In this manner, a close approximation of diver presence in the underwater environment is achieved. The individual details of such control mechanisms are well understood in the art and may be incorporated in this invention following the well recognized design practice common to the marine engineering arts. For example, the manipulator 317 may be that shown in U.S. Pat. No. 3,703,968 issued on Nov. 28, 1972 to Richard W. Uhrich for "Linear Linkage Manipulator Arm." Similarly, the visual presentation system may, if desired, be that disclosed in U.S. Pat. No. 3,916,094 issued on Oct. 28, 1975 to F. A. Marrone for "Submersible Visual Simulator For Remotely Piloted Systems."

Figure 5:
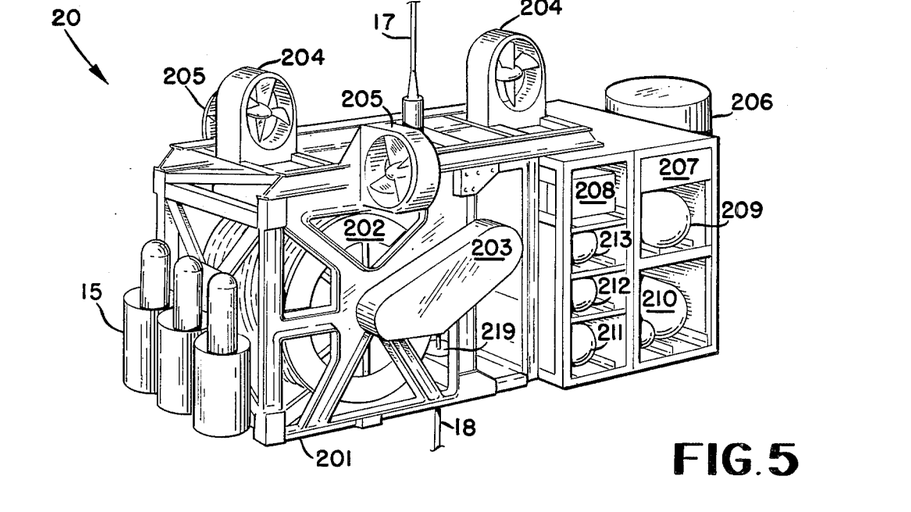
FIG. 5 is a perspective view showing the lift module used in the system of the invention.

Referring to FIG. 5, the details of the PCT 20, which, as previously described, serves as a lift and instrument package, is disclosed. As shown, PCT 20 comprises a generally box-like frame 201 which houses, among other equipment, an oceanographic winch 202 upon which secondary tether cable 18 is spoolably wound. Winch 202 is driven by suitable underwater motors, not shown, through a conventional axial drive unit 203. Hydraulic thrusters are positioned on the upper surface of PCT 20, two of which, indicated at 204, are longitudinally spaced and face laterally outward to provide lateral thrust for the module. Similarly, a second pair indicated at 205 are spaced on opposite sides of PCT 20 and face fore and aft to provide longitudinal thrust for the module. Thus, by suitable power control of thrusters 204 and 205, the underwater position of PCT 20 may be easily controlled to occupy positions other then directly beneath the surface support vessel 10.

Such a translated position is illustrated in FIG. 1 discussed above.

An auxiliary buoyancy lift unit 206, and other auxiliary work tools, can be stored on the aft end of PCT 20 to be removed and used by the vehicle's manipulator 317 to accomplish special work tasks.

Additionally, a plurality of instrument packages and power distribution packages indicated at 207, 208, 209, 210, 211, 212, and 213 are carried by PCT 20 and house various multiplex circuitry and signal processing circuitry to be more completely described. A height-off-bottom sonar, not shown, is employed on the PCT to monitor its position relation to the sea floor.

Secondary tether cable 18 is paid out and recovered through a fairing device 219 which includes a gripping device for an attachment member 319 carried upon the upper surface of submarine work vehicle 30.

Figure 6:
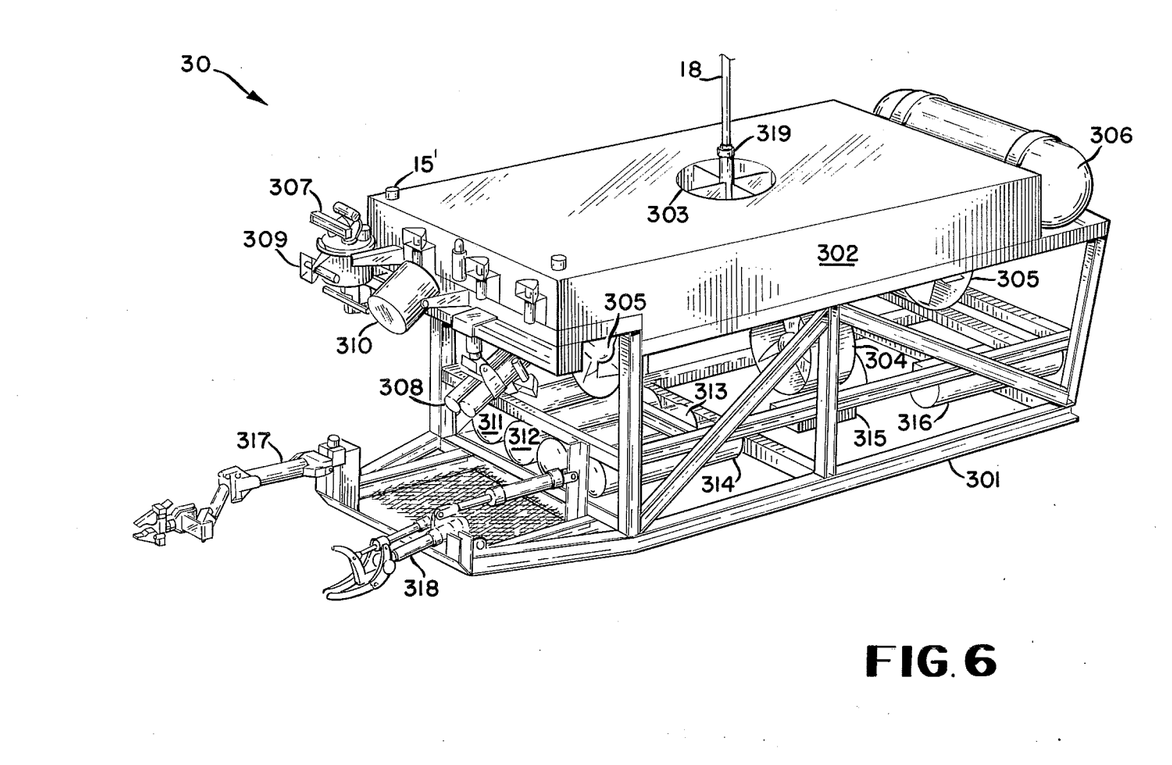
FIG. 6 is a perspective view of the submarine work vehicle according to the invention.

Referring to FIG. 6, the details of the submarine work vehicle will be more completely described. As shown, the vehicle 30 includes a box-like frame 301 which provides mechanical support for the various elements employed in the submarine work tasks. On the upper surface of frame 301 a layer of syntactic foam buoyant ballast 302 provides for slightly positive buoyancy for the vehicle in the water. A vertically directed thruster 303 is centrally mounted on the upper surface of framework 301 and is ducted through the layer of syntactic foam 302 to provide a slightly downward force to achieve neutral buoyancy and to accomplish vertical movement for the submarine work vehicle so as to facilitate the control thereof. Similarly, longitudinal movement of vehicle 30 is provided by a pair of longitudinally directed thrusters 304, one shown, and a pair of transverse thrusters 305. In this fashion, complete three dimensional movement of submarine work vehicle 30 may be conveniently accomplished.

A pressurized housing 306 provides encapsulation of the necessary control circuitry to provide operational instrumentation and control from the signals transmitted to submarine work vehicle 30 by means of secondary cable 18.

Along the forward edge of submarine work vehicle 30, and in an area inaccessible to the manipulator, navigational and observational hardware may be mounted. This might include a vehicle search sonar 307 that is useful in vehicle guidance and obstacle avoidance. Similarly, a television camera 308 together with the associated illumination source may also be mounted in a manner as previously explained, to enable control by head movements of the operator, providing a visual representation of objects within the viewing range of the vehicle. Additional quartz-iodide and thallium iodide lights 309 provide fill illumination to reduce shadows and generally enhance the visual presentation made by camera 308. Two cameras may also be used which are controlled to be alternately activated for greater reliability, or used in a stereo mode to enhance the operator's depth perception and realism of control presence.

A photographic camera and associated strobe unit are shown at 310 and are also controllably directed to photograph objects on the ocean floor. If desired, the camera and light arrangement may be that shown in U.S. Pat. No. 3,757,042 issued on Sept. 4, 1973 to C. J. Funk for "Pan and Tilt Underwater Optical Viewing System With Adjustable Source-Receiver Separation and Zoom Lenses." Likewise, the camera and viewed arrangement may be that shown in U.S. Pat. No. 3,903,358 issued on Sept. 2, 1975 to John A. Roese for "PLZT Stereoscopic Television System," if desired.

Pressure proof housings 311, 312, 313 and 314 provide housing for power and motive energy sources for these various components.

A height-off bottom sonar altimeter 315 is mounted on the lower surface of submarine work vehicle 30 where it may effectively indicate the height of the submarine vehicle 30 from the ocean floor.

A pair of manipulators are mounted on the front of the submarine work vehicle 30 and are controlled to perform the desired work in the ocean depths. Manipulator 317 is the versatile work "hand" while manipulator 318 is used to grab and hold tightly onto the object while work is being conducted. A motor-pump unit is also carried aboard submarine vehicle 30 and is housed in an oil-filled, ambient pressure housing illustrated at 316. This unit provides hydraulic power for the propulsion thrust unit and for the manipulators 317 and 318 as well as hydraulically actuated tools.

A coupling support member 319 extends over and vertically upwardly from, the top of submarine vehicle 30 and is configured to cooperate with a supporting catch 219 on PCT 20 as previously described.

Thus, it may be seen that the submarine work vehicle 30 (FIG. 6) is uniquely adapted to cooperate with the PCT 20 such that, when secondary tether 18 is spooled on oceanographic winch 202, submarine vehicle 30 is drawn to, and engaged in, a supportive relationship with PCT 20.

The design of the remote underwater work system has required reconsideration of design parameters and oceanographic cables and the improved capabilities of the entire system have been made possible by the particular design of the oceanographic cables employed. Correspondingly, the mechanical and the electrical demand imposed by the system of the invention have advanced the state-of-the-art in the oceanographic cables by placing weight and power considerations on the electronic and mechanical cabling which advances the state-of-the-art of electromechanical cables and handling gear. It is the interoctional synagism of these elements which make possible the accomplishment and practical achievement of the aforestated objects of invention.

Both the primary cable 17 and the vehicle tether cable 18 employ a synthetic strength member which has made these mutual advances possible. The high strength-to-weight synthetic material and the cable concept holds a high potential for application to other oceanographic areas and its description herein as a component of the system of the invention will be readily recognized as having a wide variety of applications.

The synthetic material used in this high strength application is a fiber supplied in a multiple-filament yarn which is twisted in a polyurethane matrix into strength members which are used to replace the individual armor and strength members in conventional oceanographic electromechanical cable design. Although a variety of materials may prove satisfactory for various applications, that which has been particularly successful in the ocean applications is marketed by the Dupont Corporation under the tradenames KEVLAR-49 and PRD-49.

Figures 7, 8:
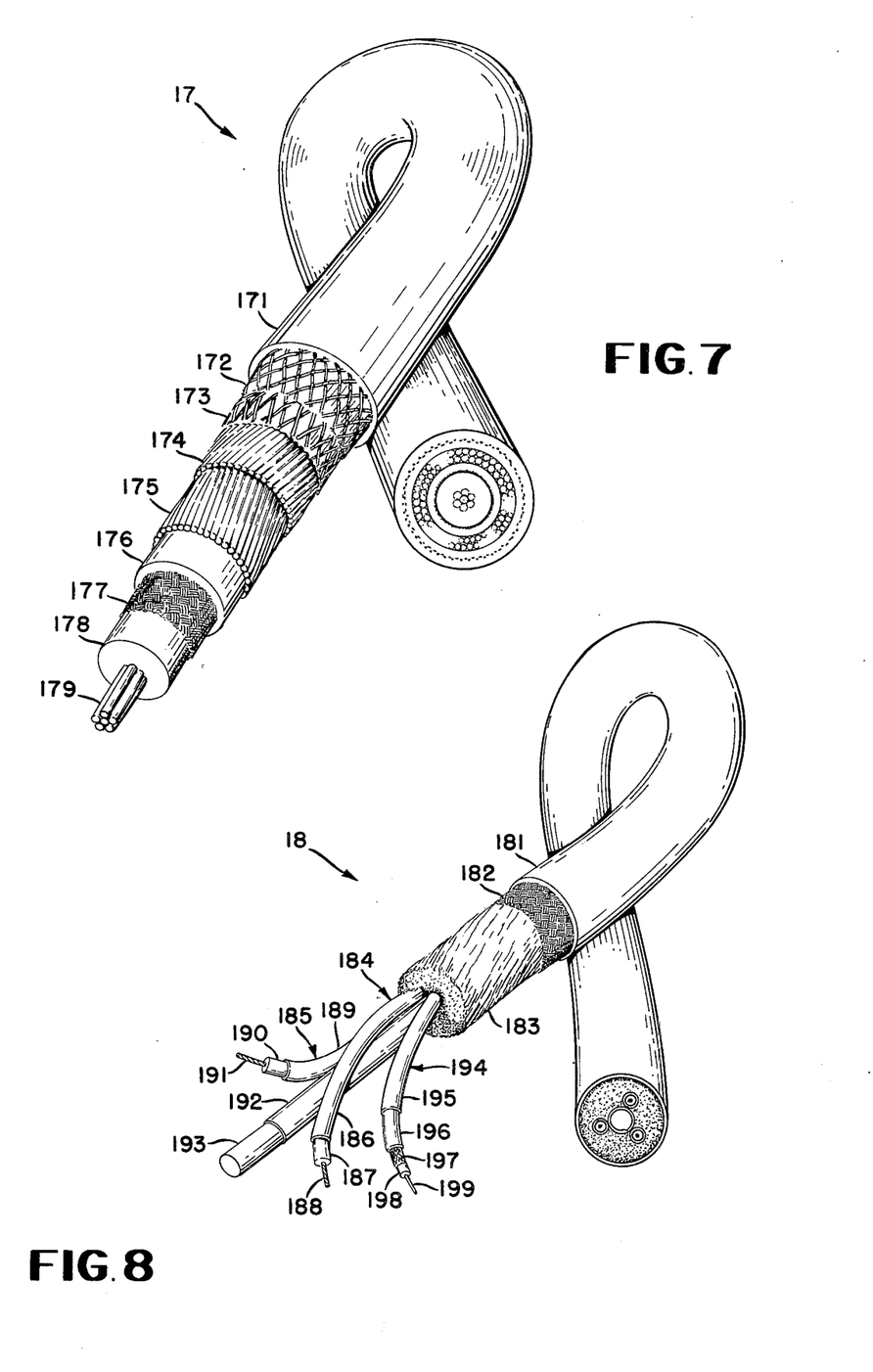
FIG. 7 is a partial cut-away view of a section of a length of primary tether cable used in the invention.
FIG. 8 is a partial cut-away view of the section of the secondary tether used in the practice of the invention.

Referring to FIG. 7, a description of the primary cable 17 will illustrate how this material is used in oceanographic cable construction. Primary cable 17 has an optional outer protective cover 171 which may be of a synthetic rubber or reinforced plastic as is conventional in the oceanographic cable art. Inside outer cable cover 171, two optional woven reinforcement sheaths 172 and 173 provide additional protection for inner members. Next, layers 174 and 175 are composed of the plurality of strands of KEVLAR-49 having opposite lay direction to prevent twisting or counter-rotation of the cable when placed under tension.

Within these opposite lay layers, which are responsible for the strength transmitting properties of a completed cable, is a concentric layer of high density polyethylene or polyurethane plastic material 176 which forms a waterproof and dielectric covering for the wires of a spirally served coaxial conductor 177.

A center coaxial insulating material 178 is formed of a sleeve polyethylene dielectric material which coats and provides spacing for a central conductor 179 which may be, for example, a 36-wire twisted cable. Conductor 179 and coaxial sheath 177 provide the conductive path for both the power and multiplexed control signals thereon. This construction provides a working voltage of 3,000 volts with a loop resistance, for 24,000 feet, of only 22 ohms. Additionally, a characteristic impedance of 50 ohms is obtained permitting a frequency transmission of multiplex signals such that an attenuation at 12 megacycles of only 60 decibels is obtained.

Although the actual breaking strength of the cable is less than prior-art steel cable constructions, the much lighter weight of the improved construction, just described, permits an increase of static safety factor five times greater than the steel construction.

The light weight of the improved construction facilitates movement of the underwater vehicles with relatively low power thrust units. In addition this construction facilitates surface storage and transportation of the entire system.

Referring to FIG. 8, the description of the secondary tether will indicate another construction employing the improved high tensile strength material previously described in connection with primary cable 17. As shown, an outer conductor 181 surrounds an inner braided layer 182 which may conveniently be made of nylon which encases a sheath of stranded methyl pentene polymer. The secondary tether has three electrical conductors contained therein including two identical power conductors 185. Conductors 185 have separate insulating coatings including an outer polyurethane coating 186 and 189 which encircles and protects an internal polyethylene dielectric coating 187 and 190 which, in turn, surrounds the copper-clad aluminum conductors 188 and 191.

The third electrical conductor indicated at 194 includes a length of RG-174 coaxial cable. The total unit includes a polyethylene dielectric sheath 196 which surrounds a braided metallic coaxial conductor 197 which is spaced from a central inner conductor 199 by means of a polyethylene dielectric sheath 198. This entire coaxial cable assembly is additionally protected by a polyurethane coating 195.

Improved tensile strength and load carrying capability of secondary tether 18 is made possible by means of a center strain-relieving member 193 which, is preferably made of several helically wound members of KEVLAR-49 as described in the construction of the primary cable 17 of FIG. 7. This KEVLAR-49 load carrying member, which may be braided if desired, is encased with a protective polyurethane jacket 192.

These constructional techniques provide the principal significant features of the secondary tether. That is, the cable possesses its high strength and small diameter, while maintaining positive buoyancy at ocean depths to at least 20,000 feet. These features all combined here to a degree not previously obtainable.

Thus, it may be seen that a pair of oceanographic cables are provided for the system of the invention which, although uniquely adapted for the system for which they were developed, provide a significant advance in the underwater cable arts.

Figure 9:
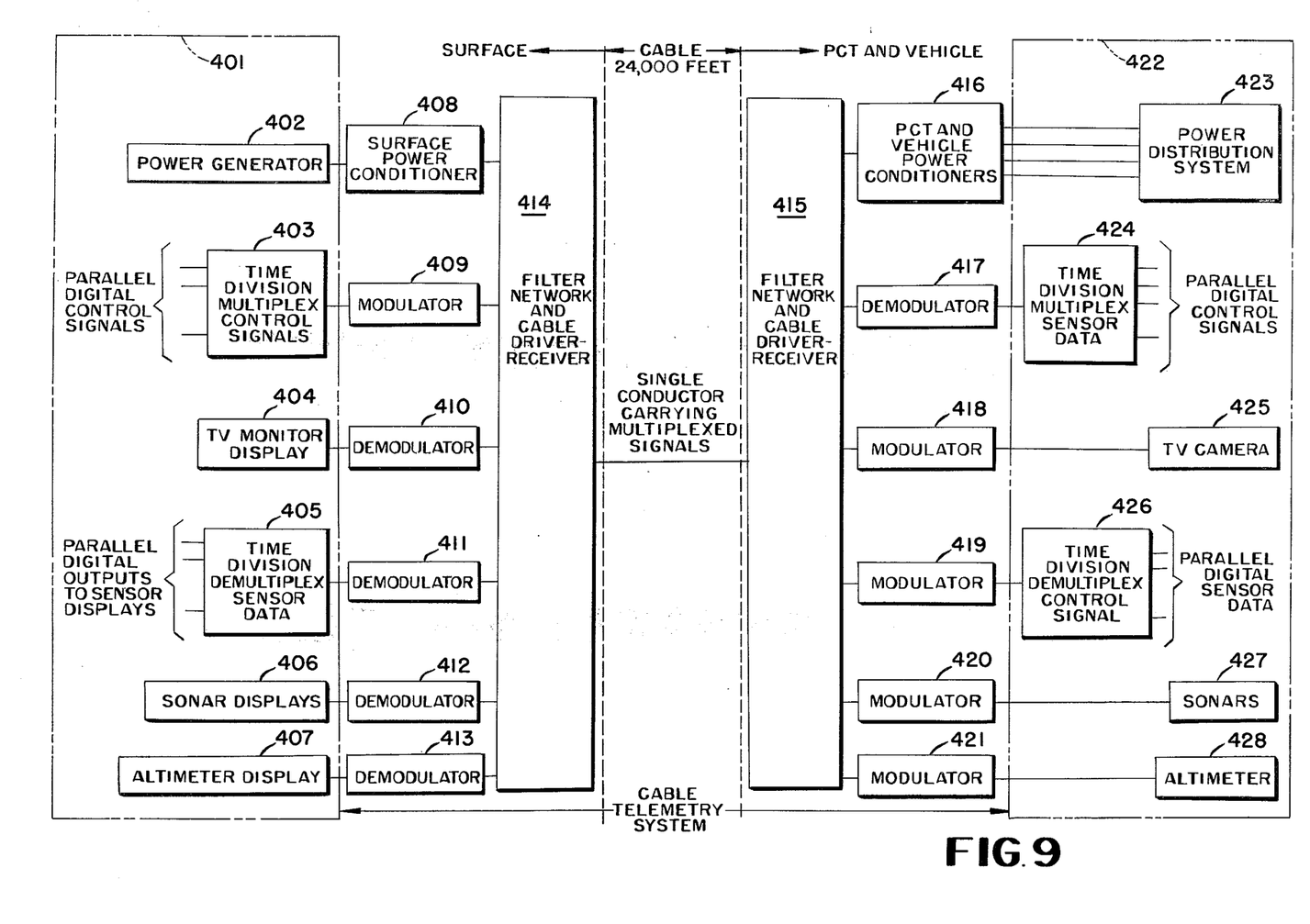
FIG. 9 is a diagrammatic view illustrating the major control compartments of the invention.

Referring to FIG. 9, the control system of the invention will be described which permits the utilization of the work system elements, previously described, in the desired fashion. It should be noted, from the outside, that, although the system is made complex by the number of units and their potential for inter action, in reality the cooperation between individual units remains straightforward and requires no unique adaptation of the circuitry except for the well-understood waterproofing and protection from the arduous conditions imposed by the operational environment. As illustrated, the surface control units are to the left of the figure and the primary cable termination system and submarine vehicle are to the right of the figure. The single line joining these two sections represents the primary cable 17 which carries both the power and the control instrumentation signals multiplexed thereon.

Box 401 represents the surface input and output from the multiplex system and includes a power generator shown at block 402 which may include, for example, the deck-mounted generator 19' shown in FIG. 2. Block 403 indicates the time division multiplex control signal input processors which receive parallel digital control signals from the manual controls which provide operational control signals for the various thrusters, manipulators, pan and tilt drive for the cameras, and other controlled functions on the vehicle and primary cable termination system. Box 404, labeled TV monitor display, is the video output from the head-controlled camera 308 illustrated in FIGS. 4 and 6.

Block 405 indicates the time division multiplex sensor data processors to operate parallel digital outputs which, in turn, operate the various sensor displays. Block 406 represents the sonar displays which indicate the conventional sonar output from search sonar 307. In a similar fashion, block 407 indicates the altimeter display which provides selective altimeter readings from either the height-off-the-bottom sonar in the primary cable termination 20 or the height-off-bottom sonar 315 shown in FIG. 6 on submarine work vehicle 30.

Each of these power inputs or sync-signal outputs is fed by suitable multiplexing modulator or demodulators, indicated at blocks 408 through 413. That is, block 408 indicates the surface power conditioner which takes the electrical power from power generator 402 and feeds it through filter network located at block 414 into the primary cable 17. Likewise, modulator 409 converts the parallel digital control signals from the various manipulator controls into time shared multiplex signals which may be transmitted along with the electrical power to the primary cable 17, and thence to the primary cable termination 20 and submarine work vehicle 30. Similarly, the individual returned signals are demodulated by demodulators 410, 411, 412 and 413 to be connected to TV monitor display 404, time division multiplex sensor data 405, sonar display 406, and altimeter display 407, respectively. The corresponding filter and cable driver receiver, indicated in block 415, is carried by the PCT 20 and receives the power and multiplex signals to perform appropriate filtration and signal division such that the power for the PCT 20 and vehicle 30 are provided.

The PCT and vehicle power conditioners are indicated at block 416 and feed the power distribution system 423. Demodulator 417 receives control signals and feeds the signals to a time division multiplex sensor data circuit, indicated at block 424. This output provides parallel digital control signals for the various controlled devices carried on the submarine work vehicle 30. Likewise, a modulator 418 receives video signals from TV camera 308, which is carried on the vehicle and indicated at block 425, and converts these signals to modulated multiplex signals to be transmitted to the surface by the cables 17 and 18.

As previously discussed, TV camera block 425 may include TV camera 308 as well as other auxiliary cameras carried by PCT 20 and the submarine work vehicle 30.

The sensor signals which are received from the various sensors such as 15 and other sensed data from transponders on PCT 20 and the submarine work vehicle 30 are connected to multiplex signals which are modulated by a time multiplex modulator 419 to be transmitted via cables 17 and 18.

In like fashion, the search sonar outputs 427 and the outputs 428 are fed to modulator 420 and 421, respectively and are further converted to time multiplex signals to operate the various sonar displays within the control van 21.

MODE OF OPERATION

In a typical operation, a surface ship 10 with a remote-controlled underwater work system aboard would steam to a target area using satellite navigation system presently employed by surface vessels. Near the site of interest, three deep ocean transponders 13 are deployed and their positions accurately surveyed.

The submarine work vehicle 30 and the PCT 20 are picked-up in a "piggyback" or docked configuration from their deck dollies 23 and lowered to the operational depth. There, approximately 200 feet above the bottom, this descent is stopped and, on command, work vehicle 30 is separated from the PCT 20 and remains suspended at this depth. By paying out the secondary vehicle tether 18 from oceanographic winch 202, a degree of freedom is provided for the submarine work vehicle 30 to maneuver within the vicinity of the PCT 20. By operation of the thrusters 204 and 205 carried upon the submarine work vehicle 30, the depth of the submarine work vehicle and its position relative to PCT 20 is controlled. The relative position of the two vehicles may be obtained from the interrogator responders, 15 and 15' carried on each vehicle.

The navigation display aid in maneuvering the work vehicle 30 and the PCT 20 may be concurrently operated from control van 21 on the deck of surface vessel 10.

As previously discussed, a wide angle search sonar 307 on the submarine work vehicle permits navigation to the underwater object 6 and positions the submarine work vehicle such that the operating personnel may see the object 6 within the field of view of head-controlled TV system 308. In this position, the operator, wearing head gear 216 by moving manipulator controls 215, may influence manipulator 317 to perform the desired work on the underwater object 6.

If additional mechanical support is required, a more powerful but somewhat limited motion capability manipulator 318 may be used to "grab" a large object nearby or an ocean bottom feature to hold submarine work vehicle 30 in a fixed position. Alternatively, grabber 318 may hold onto work piece 6' while manipulator 317 performs work thereon using a variety of built-in or accessible tools carried on submarine vehicle 30.

At the conclusion of the work operation, submarine work vehicle 30 returns to PCT 20 using thrusters carried thereby and other navigational systems carried on the vehicle. Submarine vehicle 30 is positioned below PCT 20 and oceanographic winch 202 is operated to reel in the secondary tether 18. This reeling operation is facilitated by using full down thrust on the submarine work vehicle 30 provided by thruster 303 until connector 319 is mated within recepticle 219 where latch-up occurs.

Piggyback recovery is then made in the reverse fashion to launching and, upon emerging, the units are separated and returned to their individual dollies on the deck of surface vessel 10.

Finally, navigational beacons 13 are released by means of acoustic command signals and float to the surface where they are recovered.

The foregoing description taken together with the appended claims constituted disclosures such as to enable a person skilled in the electronics, oceanographic engineering, and naval architecture arts having the benefit of the teachings contained therein to make and use the system of the invention. Further, the structure herein described meets the aforestated objects of invention, and, in general, constitutes a meritorious advance in the art unobvious to such a person not having the benefit of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. A remotely controlled underwater work system comprising:
   a surface control station;
   a primary cable operatively connected to said surface control station at its upper end and extending vertically downward therefrom and configured to provide mechanical support to loads attached thereto and to provide electrical energy transfer therealong;
   primary cable terminating means connected to said primary cable for underwater support thereby and including,
      attachment means mounted on the lower surface of the primary cable terminating means for releasable support of loads attached thereto,
      controllably powered reel means mounted on said primary cable terminating means for paying out and recovering a secondary cable,
   a secondary cable wound on said controllably powered reel means,
   hydrodynamic thrusting means mounted on said primary cable terminating means in fixed relation thereto for providing stabilization and limited spatial positioning thereof, and electrical signal distribution means mounted on said primary cable terminating means and electrically connected to said primary cable for receipt of electrical energy therefrom and effectively electrically connected to said controllably powered reel means, said secondary cable, and said hydrodynamic thrusting means for apportioning the electrical energy thereto; and work vehicle means attached to said secondary cable for providing a work station and including, propulsion means mounted on said work vehicle for moving said work vehicle in a predetermined area and electrically connected to said secondary cable for receipt of electrical energy therefrom, mechanical manipulator means mounted on said work vehicle and effectively connected to said secondary cable means for receipt of control signals therefrom, support means mounted on the upper surface of said work vehicle means and constructed to cooperate with said attachment means for permitting selective attachment of said work vehicle to the primary cable terminating means to establish a unitary assemblage therewith, and communication means mounted on said work vehicle means and electrically connected to said secondary cable for transmission of signals therethrough.

2. A remotely controlled underwater work system according to claim 1 wherein said control station includes a constant tension marine crane effectively connected to payout and retrieve said primary cable.

3. A remotely controlled underwater work system according to claim 1 in which said surface control station includes an enclosed van on a surface vessel.

4. A remotely controlled underwater work system according to claim 3 in which said surface control station includes sensor control linkages operated by the head movements of an operator within said enclosed van.

5. A remotely controlled underwater work system according to claim 4 in which said control station includes time shared multiplex circuitry to translate control signals from said head operated control to multiplex control signals for transmission along said primary cable.

6. A remotely controlled underwater work station according to claim 1 in which said primary cable includes a coaxial electrical conductor.

7. A remotely controlled underwater work system according to claim 1 in which said primary cable includes a plurality of oppositely wound synthetic fiber tension bearing layers.

8. A remotely controlled underwater work system according to claim 7 in which said synthetic fiber layers are each comprised of a plurality of strands of multiple-filament yarn twisted in a polyurethane matrix into filamentary strength member.

9. A remotely controlled underwater work system according to claim 1 in which said primary cable terminating means additionally includes an electroacoustic transponder for cooperating with oceanographic navigation buoys.

10. A remotely controlled underwater work system according to claim 1 in which said secondary cable is threaded through said attachment means.

11. A remotely controlled underwater work system according to claim 1 in which said electrical signal distribution means includes a multiplex filter and time sharing multiplex modulator and demodulators.

12. A remotely controlled underwater work system according to claim 1 in which said work vehicle mounted mechanical manipulator means includes two remotely controlled mechanical manipulators.

13. A remotely controlled underwater work system according to claim 12 where one of said remotely controlled manual manipulators is a limited movement grabber.

14. A remotely controlled underwater work system according to claim 1 in which said work vehicle mounted communication means includes a television camera.

15. A remotely controlled underwater work system according to claim 14 wherein said television camera includes movement controls connected between said camera and said work vehicle which are controlled by head movements of operation personnel at the aforesaid surface control station.

16. A remotely controlled underwater work system according to claim 2 in which said surface control station includes an enclosed van resting on a surface vessel.

17. A remotely controlled underwater work system according to claim 16 in which said surface control station includes control linkages operated by the head movements of an operator within said enclosed van.

18. A remotely controlled underwater work system according to claim 17 in which said control station includes time shared multiplex circuitry to translate control signals from said head operated control to multiplex control signals for transmissions along said primary cable.

19. A remotely controlled underwater work station according to claim 18 in which said primary cable includes a coaxial electrical conductor.

20. A remotely controlled underwater work system according to claim 19 in which said primary cable includes a plurality of oppositely wound synthetic fiber tension bearing layers.

21. A remotely controlled underwater work system according to claim 20 in which said synthetic fiber layers are each comprised of a plurality of strands of a multiple-filament yarn twisted in a polyurethane matrix into filamentary strength member.

22. A remotely controlled underwater work system according to claim 21 in which said primary cable terminating means additionally includes an electroacoustic transponder for cooperating with oceanographic navigation buoys.

23. A remotely controlled underwater work system according to claim 22 in which said secondary cable is threaded through said attachment means.

24. A remotely controlled underwater work system according to claim 23 in which said electrical signal distribution means includes a multiplex filter and time sharing multiplex modulator and demodulators.

25. A remotely controlled underwater work system according to claim 24 in which said work vehicle mounted mechanical manipulator means includes two remotely controlled mechanical manipulators.

26. A remotely controlled underwater work system according to claim 25 where one of said remotely controlled manual manipulators is a limited movement grabber.

27. A remotely controlled underwater work system according to claim 26 in which said work vehicle mounted communication means includes a television camera.

* * * * *